United States Patent [19]

Eschbach

[11] Patent Number: 5,208,871

[45] Date of Patent: May 4, 1993

[54] PIXEL QUANTIZATION WITH ADAPTIVE ERROR DIFFUSION

[75] Inventor: Reiner Eschbach, Fairport, N.Y.

[73] Assignee: Xerox Corporation, Stamford, Conn.

[21] Appl. No.: 820,713

[22] Filed: Jan. 14, 1992

Related U.S. Application Data

[62] Division of Ser. No. 600,542, Oct. 19, 1990, abandoned.

[51] Int. Cl.$^5$ .............................................. G06K 9/36
[52] U.S. Cl. .................................. 382/41; 382/50; 358/456; 358/457; 358/466
[58] Field of Search .................. 382/41, 49, 50, 52, 382/57; 358/458, 465, 467, 455, 443, 456, 459

[56] References Cited

U.S. PATENT DOCUMENTS

| | | | |
|---|---|---|---|
| 4,878,125 | 10/1989 | Katayama et al. | 358/456 |
| 4,924,322 | 5/1990 | Kurosawa et al. | 358/457 |
| 4,955,065 | 9/1990 | Ulichney | 382/50 |
| 4,969,052 | 11/1990 | Ishida et al. | 358/457 |
| 4,975,786 | 12/1990 | Katayama et al. | 358/457 |
| 5,077,812 | 12/1991 | Kanno et al. | 358/466 |
| 5,086,484 | 2/1992 | Katayama et al. | 382/50 |

*Primary Examiner*—Jose L. Couso
*Attorney, Agent, or Firm*—Mark Costello

[57] ABSTRACT

A method of image conversion takes an original print ready image at a first resolution scaling and orientation, and simulates printing that image by creating a representation of a page at the particular resolution, scaling and orientation. The image is then periodically sampled through the page with an aperture that corresponds to the desired output. Because the resolution, scaling and-/or orientation of the "print" and "scan" are distinct, the aperture "sees" areas which may correspond to more than a single pixel on the original image, and thereby may derive a signal that is gray, i.e., the aperture may see an area that is neither completely black or white, and the image data derived will be considered gray. The gray image data, which may be definable at several bits per pixel, is then made print-ready by reducing the number of bits defining each pixel to a valid output state. The reduction step is accomplished through an adaptive error diffusion method, in which thresholding error is directed only to members of a set of error receiving pixels already having a valid output state. When all the error receiving pixels have a valid output state, error is directed to those pixels in accordance with a standard error diffusion method.

2 Claims, 5 Drawing Sheets

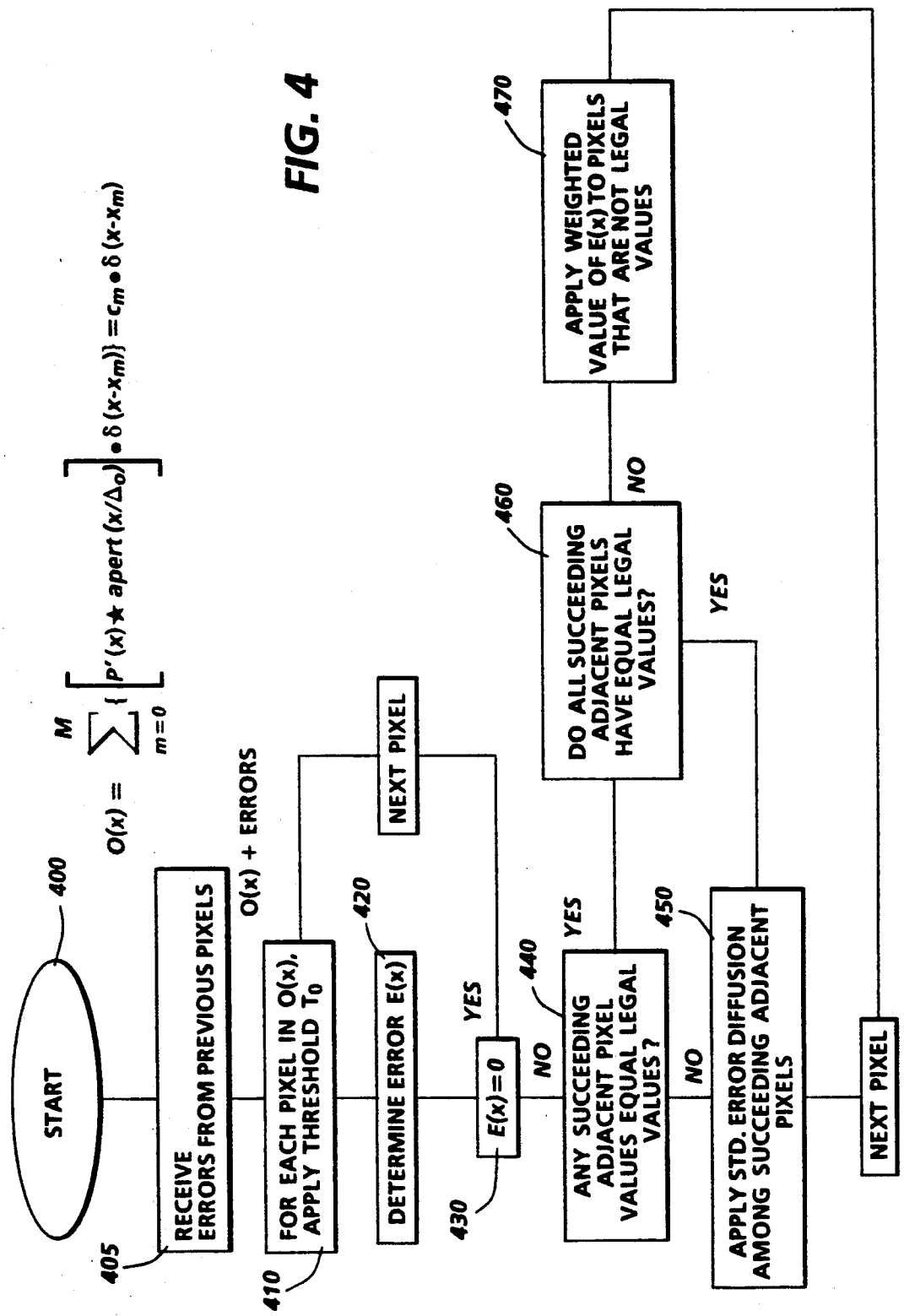

PIXEL QUANTIZATION WITH ADAPTIVE ERROR DIFFUSION

This application is a divisional application of Ser. No. 07/600,542 filed Oct. 14, 1990, now abandoned.

This invention relates to conversion of images in scale, resolution or orientation, using error diffusion techniques.

CROSS REFERENCE

Cross reference is made to co-pending U.S. patent application Ser. No. 07/396,272, entitled, "Edge Enhanced Error Diffusion Algorithm" by R. Eschbach and assigned to the same assignee as the present invention.

BACKGROUND OF THE INVENTION

Image information, be it color or black and white, is commonly generated in a bitmap format at a particular scale, orientation $\theta$ and resolution $K \times L \times b$, corresponding to a desired printer output, where K is a number of spots per unit of length in one dimension, L is a number of spots per unit length in the other dimension, and b is the depth of each pixel, in number of levels. This bitmap is present for every color separation of the output device, i.e., 4 bitmaps for a 4-color output device, 3 for a 3-color, 2 for a 2-color and 1 for a black and white output device. In a common example of a black and white output, image data comprising a bitmap to be printed is provided to a printer suitable for printing a 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation also usually provide only a single resolution output. Images are commonly arranged at a fixed orientation Increasingly, the resolution available from printers varies over a wider range of choices. Printer resolutions are available over a range, for example, from less than 200 spi to to more than 600 spi. Resolutions vary for a number of reasons, generally related to the quality of the output image. Simply printing a 300 spi bitmap at 400 spi or 600 spi is undesirable however, since the image will be reduced substantially in size on the output page or display. It would be highly desirable to provide the capability of printing any image at any resolution, while selecting the output size and orientation.

It is a common practice to implement conversion of a bitmap of first resolution $K \times L \times b$ to a bitmap of second resolution $M \times N \times d$ through simple pixel level and raster level operations, such as pixel doubling. Pixel doubling is undesirable at the binary level (where printing is commonly done, with binary printers) because of a tendency to distort pixel relationships. Scaling is an identical operation to resolution conversion, i.e., the number of pixels representing the image is increased, except that output image is represented by a lower resolution than the number of increased pixels representing the image. In other words, a conversion is implemented for a bitmap of first resolution $K \times L \times b$ to a bitmap of second resolution $M \times N \times d$ through simple pixel level and raster level operations, such as pixel doubling, but if the image is then directed to a $K \times L$ for output, it is considered scaled.

Rotation of images may be (effected) accomplished using the three shear rotation method described in "A Fast Algorithm for General Raster Rotation", Graphics Interface '86, A. Paeth, p. 77 ff. (1986) or any other standard image rotation method by treating the input bitmap as a gray image having say 8 bits per pixel and thereby creating an 8 bit rotated image which, in general, has a different distribution of values than the input, e.g. an image with only values of 0 and 1 will, in general, result in an image with a large number of pixels having values unequal to either 0 and 1. Conventional rotation of bitmaps is accomplished by moving groups of adjacent pixels along the fast scan direction by pixel distances in the slow scan direction, in accordance with their position with respect to the beginning of the scan line and thereby not change the distribution of the image values, and will commonly produce moire or other artifacts.

A primary problem of the art is that the density in any given area of coverage is not maintained with pixel doubling or similar methods. Thus, image artifacts which give the image a different appearance are noted in the resolution-converted and/or rotated image.

Algorithms that convert gray images to binary or other number of level images attempting to preserve the local density exist in applications separate from conversion. These and similar methods might be applied as one part of the method in conversion. One algorithm, which can be used to prepare an image at a given resolution and level depth of $K \times L \times c$ for printing on a printer with resolution $K \times L \times d$, is error diffusion as described in "An Adaptive Algorithm for Spatial Greyscale, by Floyd and Steinberg, Proc. of the S.I.D. 17/2, 75-77 (1976). Another, more elaborate method would be the error diffusion techniques of U.S. patent application Ser. No. 07/396,272, entitled, "Edge Enhanced Error Diffusion Algorithm" by R. Eschbach and assigned to the same assignee as the present invention.

U.S. Ser. No. 4,651,287 to Tsao and U.S. Pat. No. 4,811,239 to Tsao disclose a technique which uses an error diffusion algorithm to produce high quality images wherein the gray scale values are compared to the discrete gray scale values of a reference printed array to produce a corresponding error array. U.S. Ser. No. 4,668,995 to Chen et al. discloses a quantization error diffusion algorithm for transforming a multi-bit image into a binary image by diffusing a propagation error among neighboring blocks of pixels. U.S. Pat. No. 4,654,721 to Goertzel et al. suggests printing of gray data on a binary printer, where the gray data is normally of a lower resolution and one takes one gray pixel and transfers it into one 'dot', i.e. a number of binary pixels in the output. Goertzel determines the form and location of those dots using error diffusion and edge enhancement. U.S. Pat. No. 4,783,838 to Matsunawa discloses a multi-step technique which first divides the binary image into blocks of pixels in order to generate a gray-tone representation of the image. Image processing and enhancement can be performed on these blocks and the processed blocks are then converted to the output bitmap using a conventional threshold matrix. U.S. Pat. No. 4,742,553 to Irwin teaches mapping of similarly sized input and output pixel groups, and the use of an error passing process to account for thresholding errors in a resolution conversion process.

SUMMARY OF THE INVENTION

In accordance with the invention there is provided a method of image conversion using error diffusion techniques, such method emulating the operation of a printer/scanner/printer combination to convert an $K \times L \times b$ at $\theta$ bitmap to an $M \times N \times c$ at $\Phi$ bitmap, and subsequently to an $M \times N \times d$ at $\Phi$ bitmap for printing. K, L, M and N are resolutions in spots per inch and b, c and d are the number of levels per pixel at which the pixel information is encoded, and $\theta$ and $\Phi$ designate the orientation of the fast scan axes of both systems.

In accordance with one aspect of the invention, a method of image conversion takes an original print ready image at a first resolution, size and orientation, and simulates printing that image by creating a representation of a page at a necessary accuracy. The image is then periodically sampled by a simulated scanner with an aperture that depends upon the desired output. Because the resolutions and orientations of the "printed" image and scan apertures are distinct, the aperture "sees" areas which may correspond to more than a single pixel on the original image, and thereby may derive a signal that is gray, i.e., the aperture may see an area that is neither completely black or white, and the image data derived will be considered gray. Additionally, both the simulation of the printing and the simulation of the scanning aperture might contain weighting functions to pre-compensate for device artifacts or to enhance image quality. The gray image data, which may be definable at several levels per pixel, is then made print-ready by reducing the number of levels defining each pixel to a valid output state (0, 1 for a typical binary printer, 0, 1, 2, 3 for a quaternary printer, etc.). Here standard techniques for improving gray images, e.g.: Tone-Reproduction-Curve (TRC) changes, filtering, etc., can optionally be applied on the image in order to change the characteristics of the output or to limit the dynamic range of 'c' for cases where a dot overlap is included in the calculation, or for other image enhancement purposes. The reduction step for the number of levels is accomplished through error diffusion methods that maintain the local area gray density level or by other binarization or quantization techniques, such as dithering, that follow the same principle of local area density preservation. For brevity, the term error diffusion will be used in the following to also cover dithering and other binarization techniques that attempt to preserve local area densities.

The inventive image conversion method emulates the steps of first printing an image at a first resolution and orientation, scanning the printed image at a second resolution and orientation related to the eventual desired output to derive a gray level image, where an optional step of conventional image enhancement techniques can be used, to change the TRC, contrast, etc., and subsequently converting the gray level scanned image to a format suitable for printing, using an error diffusion technique. The new image, at the new resolution $M \times N \times d$ at $\Phi$ is then available for an output device. The conversion from $K \times L \times b$ at $\theta$ to $M \times N \times d$ at $\Phi$ occurs without regard to the value of "d". As a final step, the output is converted to the number of legal values "d".

In accordance with another aspect of the invention, image conversion is provided through a method in which a print ready input bitmap having a resolution of $K \times L$ at $\theta$ and a level depth b is first scaled and/or rotated to the required resolution $M \times N$ at $\Phi$ which calculates the overlap of the pixels placed in a given area with an appropriate interpolation functions, or any standard scaling and/or rotation operation. The result of this operation is, in general, a bitmap $M \times N$ at $\Phi$ with a depth c larger than the required depth. The reduction of the image data in c bit pixels to a printable format of the required depth d is then done via error diffusion techniques or other techniques that preserve the local area density.

In accordance with yet another aspect of the invention, any number of methods of error diffusion may be used to provide the necessary number of output levels after the scaling (or printing/rescanning) operation, including but not limited to the standard Floyd-Steinberg error diffusion method, in which error occurring in the thresholding step is distributed to adjacent pixels corresponding to a fixed weighting scheme; error diffusion with edge enhancement, as described in U.S. patent application Ser. No. 07/396,272, entitled, "Edge Enhanced Error Diffusion Algorithm" by R. Eschbach and assigned to the same assignee as the present invention, where the threshold level is varied based on image content; and an adaptive error diffusion technique, in which error occurring in the thresholding step is distributed to adjacent pixels based on whether the adjacent pixels are gray or already black or white, or distributed corresponding to a fixed weighting scheme if all the adjacent pixels are already black or white.

The inventive method described in the present application does not require the formation of blocks from individual pixels and allows for better preservation of fine detail. Additionally, the conversion from the intermediate gray image to the final output print image is done using density preserving algorithms.

The description of the inventive method is given for a single bitmap, as would be sufficient for a black and white output, but the extension to any number of bitmaps for color applications is obvious.

Other objects and advantages will become apparent from the following description taken together with the drawings in which:

FIG. 4 shows a flow chart describing the steps of the adaptive error diffusion method used with respect to the invention.

Figure 1:
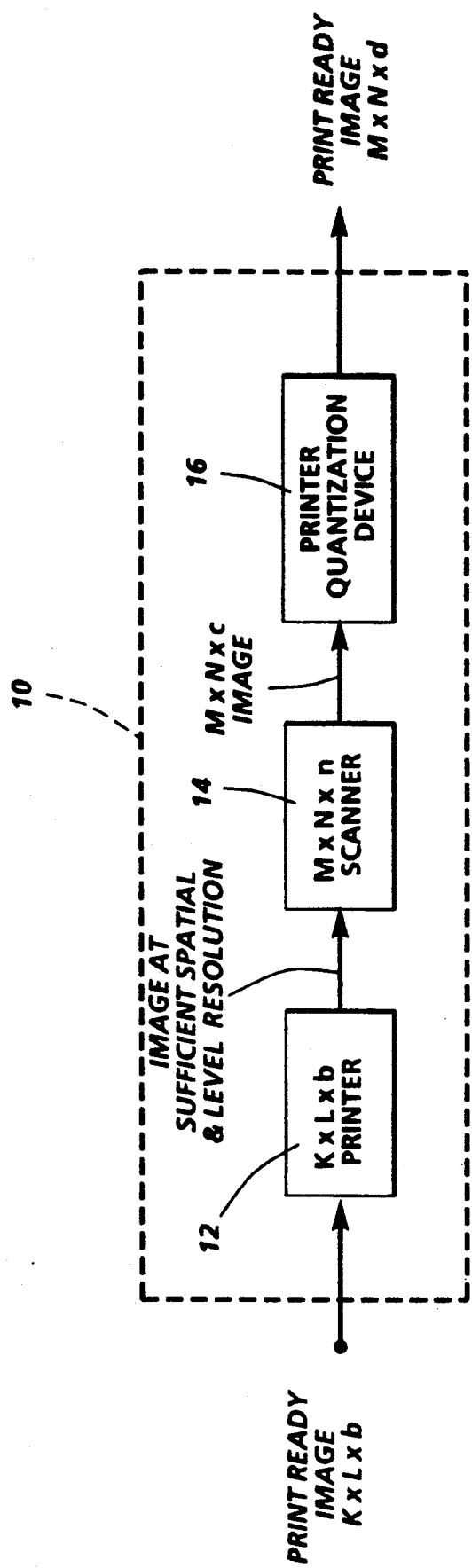
FIG. 1 shows a block diagram of the system emulation of the invention.

Referring now to the drawings where the showings are for the purpose of illustrating a preferred embodiment of the invention, and not for limiting same, FIG. 1 shows the emulation performed by the inventive image conversions method described hereinafter to convert a $K \times L \times b$ at $\theta$ bitmap to a $M \times N \times d$ $\Phi$ bitmap. The scaling of the input bitmap is done by emulating or mimicking a printing and scanning process on a general purpose or specialized computer. FIG. 1 illustrates an image conversion method 10 that emulates a useful physical method of image conversion. If equipment existed to provide the actual operations proposed (and this disclosure does not suggest that the equipment does not exist) a printer 12 might print an image that is ready for printing or display at a resolution of $K \times L \times b$ at orientation θ. "K" and "L", the resolutions in spots per unit length along the corresponding directions, hereinafter "spots per inch" (spi) might range from 72 spi to 1200 spi, with greater or lesser values not excluded and θ is the angle or axis along which the image is oriented. Angles θ and Φ are measured in relation to this arbitrary axis and the actual rotation performed is given by the difference θ−Φ. Printers usually have equal resolutions in two dimensions, i.e.: K=L and M=N, but there is in principle no such requirement. For clarity, the examples are given for this common case and all following specifications of resolution have to be understood as referring to, but not limited to, this common case. The symbol "b" represents the number of levels at which each pixel may appear. The most common printers (binary printers) have two levels, in which the first level is represented by a white spot, and the second level is represented by a black spot. Printers have been described with 4 levels, where levels 0 and 3 are represented respectively by white and black spots, and levels 1 and 2 are represented by intermediate gray levels. More levels than 2 or 4 are not prohibited. This digital description is used to software simulate a "printed image" at the necessary spatial and level resolution, where either or both the resolutions to describe this virtual page may be different from the original representation K×L×b at θ. The "printed image" is then scanned by a scanner 14, which is selected to have a resolution M×N at Φ (where M, N are resolutions in spi and Φ is the angle or axis along which the image is oriented, not necessarily parallel to θ) related to the ultimate desired output. Scanners usually produce gray image data, where each pixel forming the image data has a value representing the amount of light detected from the image. This value is usually immediately converted to a gray level value, e.g.: between 0 and 2 n, so that a scanned image is available as an output from the scanner at a M×N×c at Φ. That image must be then converted to "d" levels at a print quantization device 16, where d is the number of levels that the ultimate printer is able to print. This may be done with an error diffusion algorithm. The output of print quantization device 16 is then an image in M×N×d at Φ, ready to print at a printer capable of printing such an image. Depending on the resolution of the output device, the image now has a new resolution, scale and/or orientation.

Figure 2:
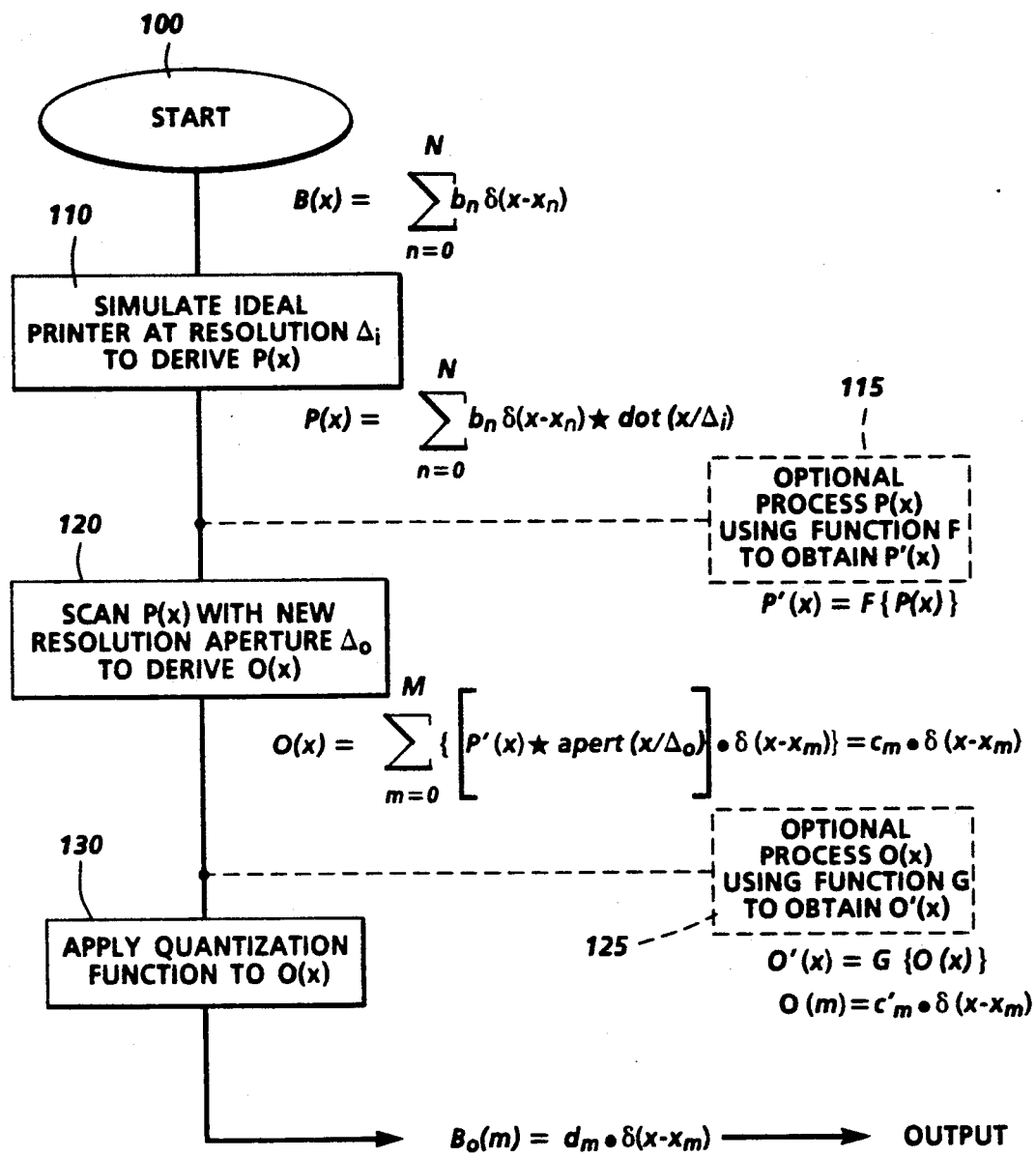
FIG. 2 shows a flow chart illustrating the inventive conversion method.

To emulate the equipment described with respect to FIG. 1, a software program may be implemented in a general purpose digital computer, operating in accordance with the method described in the flow chart of FIG. 2. At step 100, the method takes a print ready image for conversion. The input bitmap, defined by the function B(x,y) can be described by a series of delta peaks:

$$B(x,y) = \sum_{e,f=0}^{E,F} b_{e,f} \delta(x - x_e)\delta(y - y_f)$$

where:
b$_{e,f}$ is the value of the bitmap at pixel e,f;
(x$_e$,y$_f$) is the location of the discrete set of pixels (e,f);
(x,y) is the spatial coordinate and
E, F are the number of pixels in the bitmap along the different axes.

Ideal printing is simulated at step 110 by attaching the pulses that would be generated by an ideal printer at each delta peak giving the "printed" output. The print-mark of the simulated output printer can be denoted by 'dot(x/Δ$_{xi}$, y/Δ$_{yi}$)', giving the print function P(x,y) as:

$$P(x,y) = \sum_{e,f=0}^{E,F} b_{e,f} \delta(x - x_e)\delta(y - y_f) \star \text{dot}(x/\Delta_{xi}, y/\Delta_{yi}),$$

Where
★ denotes the convolution operation;
dot(x/Δ$_{xi}$, y/Δ$_{yi}$) describes the mark the printer would generate on paper with the dot-center located at (x, y)=(0,0) and resolution 1/Δ$_{xi}$, 1/Δ$_{yi}$, where the dot may be a real or ideal printer output, including, for example the characteristic outputs of write-black and write-white printers, elliptical dot printers, etc.;

P(x,y) thus describes the page as it would be generated by a printer having the same resolution as the input bitmap. For simplicity and speed, approximations can be made to P(x,y). One approximation that will be used in the examples is to describe the print-mark as black or white circles of distance (1/resolution), i.e.: 1/300 inch for K=300 spi, 1/400 inch for K=400 spi etc. Note, the description of P(x,y) is continuous in the x,y-axes, while the actual implementation will use a discrete set of x,y-coordinate values sufficient to describe the page with the accuracy needed for the specific application. At step 115 P(x,y) is optionally modified using adjustments of the tone-reproduction-curve or other standard image processing techniques as filtering, giving a modified P'(x,y) described by the function f, in order to compensate for actual printer characteristics, including enhancement or compensation for adjacency effects of two adjacent spots running together:

$$P'(x,y) = F\{P(x,y)\}.$$

At step 120, P'(x,y) is "rescanned" with aperture apert(v/Δ$_{vo}$, w/Δ$_{wo}$) that reflects the new resolution and orientation for the desired output and resampled at the new resolution and orientation, so that the output of the scanning function O(v,w) can be defined as:

$$O(v,w) = \sum_{g,h=0}^{G,H} \{[P'(x,y) \star \text{apert}(v/\Delta_{vo}, \omega/\Delta_{wo})] \cdot \delta(v - v_g)\delta(\omega - \omega_h)\}.$$

Simplifications can be used, both for the function apert(v/Δ$_{vo}$, w/Δ$_{wo}$), which reflects the scanning aperture and the print dot dot(x/Δ$_{xi}$, y/Δ$_{yi}$) in order to facilitate software or implementation. General scaling functions can be used for the conversion of the bitmap from the first resolution and orientation to the second resolution and orientation that may reflect printer deficiencies or may be used to enhance the print quality. The order of the two convolutions can be changed, and the convolution of dot(x,y) and apert(v,w) can be defined as the combined scaling, so that scaling can be done in one step. O(v$_g$, w$_h$) can then be rewritten as:

$$O(v_g, w_h) = c_{g,h} \cdot \delta(v - v_g)\delta(w - w_h),$$

with c$_{g,h}$ being one of the gray levels 'c'. O(v$_g$, w$_h$) is then optionally transformed in step 125 by a function G, as given by $$O'(v_g, w_h) = G\{O(v_g, w_h)\}$$

where G can be used to adjust the tone-reproduction curve or the enhance or filter the intermediate image, giving $$O'(v_g,w_h)=c'_{g,h}\cdot\delta(v-v_g)\delta(w-w_h)=G\{c_{g,h}\cdot\delta(v-v_g)\delta(w-w_h)\}.$$

Figure 3A:
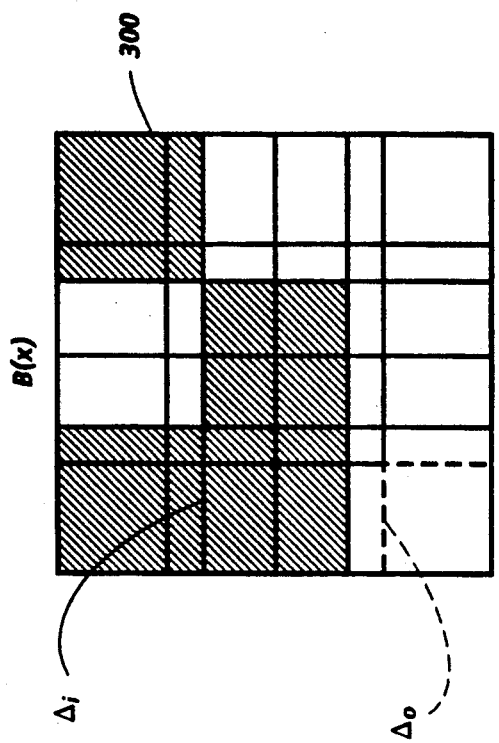
FIG. 3 shows a mapping function generated by convolving the two rect-functions.
Figure 3B:
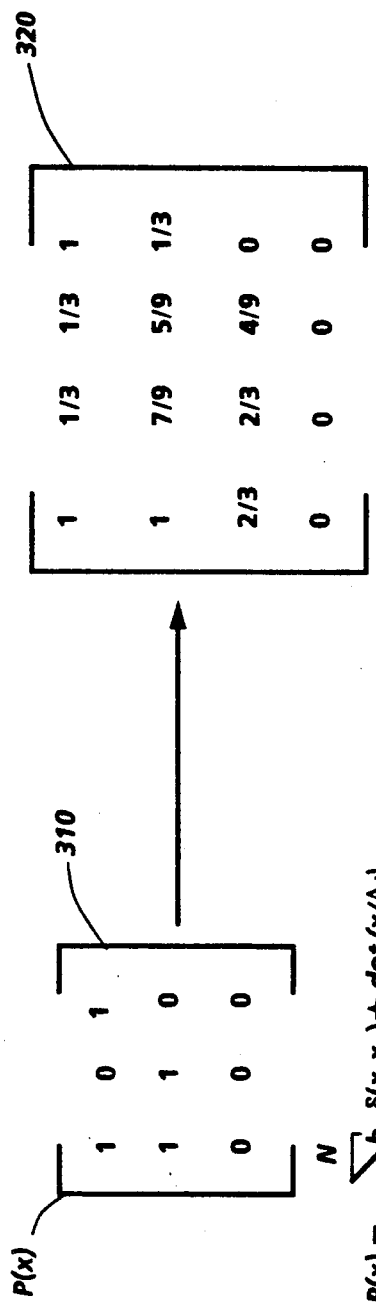

In the following, the approximation of both, dot(x,y) and apert (v,w), as being circles will be used for clarity but the described method is not restricted to this approximation. The mapping function generated by convolving the two circ-functions is shown in FIG. 3A. It can be seen that pixels in portion 300 of function B(x) at a first resolution $\Delta_i$ partially overlap with pixels at a second resolution $\Delta_o$. Thus, pixels at the second resolution have both black and white area coverage within the pixel, that can be considered as gray, where the level of gray, which lies between black and white, is a percentage of the area that is black. In FIG. 3B, there is an illustrative values in the of the conversion of the bitmap P(x,y), from K×L binary image at orientation $\theta$, to O(v,w) at orientation $\Phi$, an M×N gray level image 320. The depth 'c' of each pixel is determined by the scaling and/or rotation used, the resolutions involved and the system handling the computation of the amount of gray.

Rotation of images may alternatively be effected using the three shear rotation method described in "A Fast Algorithm for General Raster Rotation", Graphics Interface '86, A. Paeth, p. 77 ff. (1986). The input bitmap may be treated as an 8 bit deep image, to produce a gray level output when using standard rotation methods.

The use of simplifications for the dot and/or aperture functions allows for fast algorithms. Other functions can be used, however, in order to reduce graininess, to increase sharpness, or to simulate deficiencies and characteristics. 1-dimensional examples are:

$$\exp(|-x|/\Delta)^2, \frac{2}{1+e^{(x/\Delta)}}, \text{ and } \exp(|x|/\Delta)$$

without limitation of the invention to the mentioned examples.

As an alternative step 120, an implementation of the above scaling arrangement by table look-up can be achieved in situations where the ratio of the two resolutions is equal to the ratio of two integers (300/400=¾, 240/300=5/6), where the table look-up size is dependent on the integers and small for the ratio of two small integers. Another alternative step 120 for conversions that are not the ratio of two small integers is to scale to a near resolution which can be described as the ratio of two small integers and to adjust for the final, small discrepancy by using a fast interpolation algorithm, with for example a linear interpolation. As an example, a conversion from 300 to 450 (6/9) could thus be achieved by first converting the bitmap from 300 to 400 spi and subsequently scaling it by 1.125 using a linear, cosine, gaussian, or other interpolation function.

With reference again to FIG. 2, at step 130, the output O(v,w) generated by the scaling step 120, followed by an optional adjustment 125, has, in general, a number of levels 'c', larger than the desired number of levels d for printing. If an eight bit gray system is used, for example, 256 levels of gray might be generated, dependent on the actual scaling and rotation, which must be reduced to 2 levels, either black or white in a binary printer or display system. The reduction or quantization to the required number is performed using an error diffusion algorithm. Three different forms of error diffusion have been used, including standard error diffusion, error diffusion with edge enhancement, and an adaptive error diffusion.

Error diffusion produces individual dots that are normally non-printable. In the present applications this is not true; the output of the scaling operation, for example in the binary case, is "highly" binary which means that a high percentage of the values of O(v,w) are black or white. In general, O(v,w) in this example consists of black or white areas with few pixels of gray at the boundary between them. The gray areas are attached to black areas and the error diffusion can only produce dots in gray areas, which leads to dots touching the black areas. This phenomenon is similar to the half-bitting for fonts and warrants the printability of the bit-map. The same argument can be used for multilevel bitmaps.

In the description of the error diffusion procedurs, O(g,h) as a short-hand notation of O($v_g,w_h$), will be used.

(a) Standard Error Diffusion

In this case, for quantization, the function O(g,h) is run through a standard error diffusion process for arbitrary number of levels equal to the desired printer output (see, An Adaptive Algorithm for Spatial Greyscale, by Floyd and Steinberg, Proc. of the S.I.D. 17/2, 75-77 1976, expressly incorporated by reference herein). In standard error diffusion, the processing of each pixel of image data is dependent upon the result of processing other pixels. The value at the pixel in consideration is compared with a threshold. If the value exceeds the threshold the output is set to 'white', else it is set to 'black' for the binary case. The difference between the considered pixel and the output value (1 or 0) is the local error. The local error is then divided into 4 parts of, in general, different size and the parts are added to the neighboring unprocessed input values to yield modified input pixel O'(g+i, h+j) where the range of 'i' and 'j' is given by the error distribution. Standard error diffusion, as described by Floyd and Steinberg distributes the error generated at pixel (g,h) with the weights 7/16$^{th}$ to the next pixel to the right (g+1, h) with the weight 1/16$^{th}$ to the pixel down-right (g+1, h+1), with weight 5/16$^{th}$ down (g, h+1) and with 3/16$^{th}$ down-left (g−1, h+1). The weights are fixed for the whole procedure and do not vary with location or image content. Any pixel resulting from the function O(g,h) can have a magnitude represented by a value between 0 and 1. If the actual value of the pixel is perhaps ¼, that pixel might be set equal to 0, and the local error in this determination is equal to ¼. Alternatively, the pixel might be set to 1, with a resulting local error of ¾. The algorithm successively compares the modified inputs O' with the threshold and generates binary output pixel. Discarding or ignoring the error generated during this quantization step, as done in thresholding or screening, causes a loss of image density information in that particular local area of the image, resulting in generally strong image artifacts for conversion applications.

(b) Error Diffusion With Edge Enhancement

The quality of the conversion can be increased in certain applications by using a modification of the error diffusion algorithm that increases edge enhancement, as taught by U.S. patent application Ser. No. 07/396,272, entitled, "Edge Enhanced Error Diffusion Algorithm" by R. Eschbach, and assigned to the same assignee as the present invention, and expressly incorporated by reference herein, where the threshold level is selectively modified on a pixel by pixel basis and may be used to increase or decrease the edge enhancement of the output digital image, thus, more closely representing the original detail and edge sharpness of the input image.

(c) Adaptive Error Diffusion Algorithm

The special form of the images generated by scaling and/or rotating print ready bitmaps (as opposed to standard gray scale or continuous tone images) allows an adaptive algorithm which includes the original error diffusion on gray images as a special case. In accordance with the flow chart of FIG. 4, the adaptive error diffusion algorithm differs from the original by changing the weights and the destination of the error depending on the input context. Starting at step 400 with O(g,h), each pixel gray level value in O(g,h) is thresholded at step 410. At step 420, error E(g,h) is derived, as the difference between the threshold value (in a binary system, 0 or 1) and the gray level pixel value O(g,h).

At step 430, if the value of O(g,h) equals one of the legal output values of the printer system no error E(g,h) is generated and the output $B_o(g,h)$ is set to O(g,h). If the value of O(g,h) is not equal to one of the legal output states of the system, the error E(g,h) is calculated as difference between the value O(g,h) and the legal output state $B_o(g,h)$ used at location (g,h). The error E(g,h) is then distributed to succeeding adjacent pixels in an image content dependent way.

With continued reference to FIG. 4, at step 440, if all the succeeding, adjacent pixels of the pixel in consideration are gray, an error diffusion algorithm with fixed weights—not limited to the weights described in the aforementioned reference—is applied at step 450, as described above at (a). Subsequently, the next pixel is handled. Alternatively, at step 440, if any of the succeeding adjacent pixels are legal values (0, 1), then, at step 460, the function is examined to determine if all of the succeeding adjacent pixels are legal values. If all the succeeding adjacent pixels are legal values, then an error diffusion algorithm is applied at step 450, as described above at (a), not limited to the same weight distribution as used for the case where no neighboring pixels have gray values. However, if the adjacent succeeding pixels are of mixed gray and legal values, then at step 470, the errors from a pixel having a gray level value are passed on to other gray level value pixels, as opposed to legal value pixels. Subsequent to distribution of the error, the next pixel is handled. The effect of this adaption is a reduction in image noise and a more deterministic half bitting effect on edges. It should be noted that the description is independent on the actual distribution of the errors to the succeeding neighboring gray pixels. For the special case of only one neighboring gray pixels, all distribution reduce to a locally one-dimensional form distributing all the error to that said gray pixel.

Figure 5:
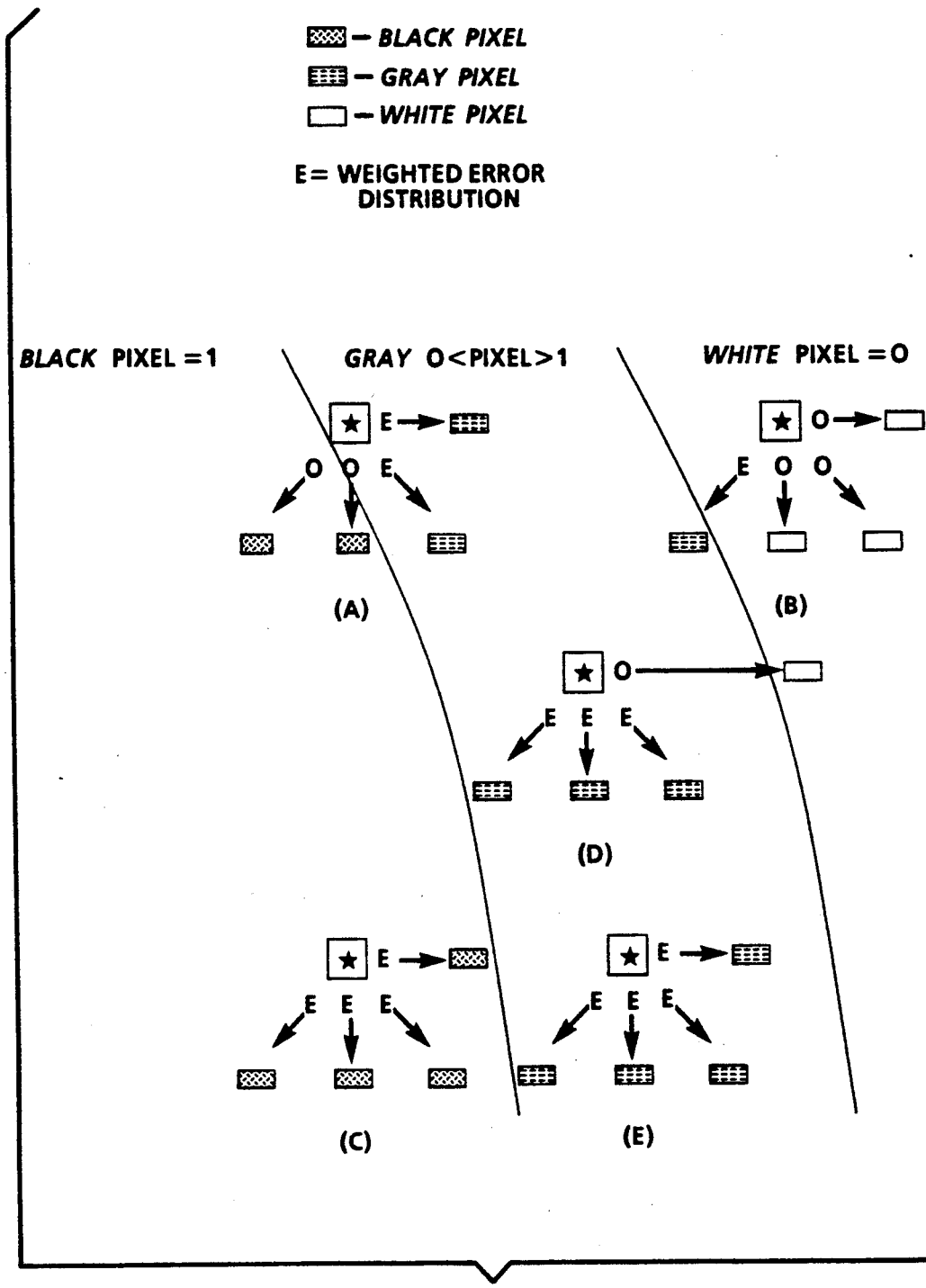
FIG. 5 graphically shows the adaptive error diffusion process.

In FIG. 5, a graphic demonstration, with several examples of the adaptive error diffusion method, is shown. It is assumed, for this example, that the output is binary, and therefore only 0 and 1 are legal outputs. The system may be extended to multiple bit printing or display systems. In an example image having black, gray and white portions, where the pixel in consideration is in the gray portion of the image, as in example (a) and the adjacent succeeding pixels are mixed black (a legal value) and gray pixels, error E is distributed to only the gray pixels. When the pixel in consideration is in the white portion of the image, as in example (b) and the adjacent succeeding pixels are mixed white (a legal value) and gray pixels, error E is distributed to only the gray pixels. When the pixel in consideration is in the black portion of the image, as in example (c) and the adjacent succeeding pixels are only black (a legal value) pixels, error E is distributed to legal valued pixels. Where the pixel in consideration is in the gray portion of the image, as in example (d) and the adjacent succeeding pixels are mixed white (a legal value) and gray pixels, error E is distributed to only the gray pixels. Where the pixel in consideration is in the gray portion of the image, as in example (e) and the adjacent succeeding pixels are all gray pixels, error E is distributed to the gray pixels. In the example, an even distribution of the error E to gray pixels has been used for clarity only, without limiting the described method to this special case.

The algorithm can easily be extended to an output that is more than 1 bit deep. In this case, the error is only distributed to neighbors that have a value that is not a correct value for the output. For a four level output ('0', '⅓', '⅔', and '1') only pixels with levels unequal to these four levels receive part of the error. Similarly, the algorithm can easily be extended to an edge enhanced error diffusion algorithm as described in (b).

While the rotation method defined is applicable to all rotations, it may be desirable to provide faster alternative and well known methods of bitmap rotation, when rotating an image to increments of 90° from parallel to the fast scan direction or slow scan directions. The defined arrangements may co-exist with such a bitmap rotation method.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method of preparing an image for printing at a printer capable of printing spots responsive to image signals having a desired output set of 'd' optical densities, each image signal representing an optical density of the image at a location therewithin, and having an original optical density selected from one of a set of 'c' original optical density values that has a number of members larger than a desired output set of 'd' optical density values, the steps comprising:

receiving an image having image signals representing printable spots at the printer and image signals which are not printable at the printer;

thresholding each image signal in the image, to produce a printable output signal having d levels corresponding to printable spots at a printer;

determining a difference in optical density between the each image signal having an original optical density selected from one of a set of 'c' original optical density values, and the printable output signal having an optical density selected from the output set of 'd' optical density values, said difference to be applied to a predetermined plurality of neighboring image signals;

for each neighboring image signal in the predetermined plurality to which the difference may be applied, comparing the optical density of the neighboring image signal to each of the legal output values which the output printer can reproduce, to determine equivalence;

applying the difference to neighboring image signals determined not to have legal output values; and if all the image signals in the predetermined set have legal output values, applying the value of the difference to all the members of the set of neighboring image signals.

2. A method of preparing an image for printing at a printer capable of printing spots responsive to image signals having a desired output set of 'd' optical densities, each image signal representing an optical density of the image at a location therewithin, and having an original optical density selected from one of a set of 'c' original optical densities that has a number of members larger than a desired output set of 'd' optical densities, where 'c' and 'd' are the number of members in the sets of optical densities, the steps comprising:

receiving an image having original image signals representing printable spots at the printer and image signals which are not printable at the printer;

for each original image signal in the image, adding a weighted error portion signal determined from the quantization of previous image signals to the original optical density of each image signal to derive an input optical density for each image signal;

determining for each image signal an output optical density from a set of possible output optical densities which the printer can reproduce, each member of the output set of 'd' optical density being a legal output value;

determining for each image signal an error signal that is a difference between the determined printable output optical density and the input optical density;

for each image signal in a predetermined set of neighboring image signals to which the error signal from the difference determination may be applied, comparing the neighboring image signal to each of the members of the set of legal output values which the output printer can reproduce, to determine equivalence;

applying the difference to the neighboring image signals determined not to have legal output values, the difference applied to each image signal in accordance with a weighted distribution related to a number of neighboring image signals determined not to represent printable spots; and if all the image signals in the predetermined set represent legal spots for the printer, applying the error signal to all the members of the set of neighboring image signals in accordance with a predetermined weighted distribution.

* * * * *